United States Patent [19]
Ying

[11] 4,443,566
[45] Apr. 17, 1984

[54] SIZED REINFORCING FIBERS SUITABLE FOR USE IN COMPOSITES OF IMPROVED IMPACT RESISTANCE

[75] Inventor: Lincoln Ying, Bridgewater, N.J.

[73] Assignee: Celanese Corporation, New York, N.Y.

[21] Appl. No.: 488,248

[22] Filed: Apr. 25, 1983

[51] Int. Cl.³ .................. B32B 9/00; B32B 27/00; D02G 3/00
[52] U.S. Cl. ................... 523/205; 428/366; 428/367; 428/375; 428/379; 428/392; 428/394; 428/408; 428/413; 428/414; 428/415; 428/416; 428/417; 428/418; 428/473.5; 523/435; 523/457; 523/468
[58] Field of Search ............... 428/367, 366, 375, 378, 428/379, 392, 394, 408, 413, 414, 415, 416, 417, 418, 473.5; 501/95; 523/206, 435; 525/523, 538

[56] References Cited
U.S. PATENT DOCUMENTS

| 3,515,688 | 6/1970 | Rose .................. 525/538 X |
| 3,641,193 | 2/1972 | Frank et al. ............ 260/830 |
| 3,702,833 | 11/1972 | Rose ................. 525/538 X |
| 3,806,489 | 4/1974 | Rieux et al. .............. 523/205 |
| 3,837,904 | 9/1974 | Hill ................ 117/139.5 A |
| 3,844,983 | 10/1974 | Reynard et al. ........... 525/523 X |
| 3,867,344 | 2/1975 | Frank et al. .............. 260/47 EN |
| 3,888,799 | 6/1975 | Rose ................. 525/538 |
| 3,914,504 | 10/1975 | Weldy ................. 428/367 |
| 3,945,966 | 3/1976 | Vicic et al. ............ 525/538 X |
| 3,948,820 | 4/1976 | Reynard et al. ........ 525/538 X |
| 3,957,716 | 5/1976 | Weldy ................ 523/468 X |
| 3,996,312 | 12/1976 | Kolich et al. ............ 260/927 N |
| 4,026,839 | 5/1977 | Dieck et al. ............ 260/2.5 FP |
| 4,042,561 | 8/1977 | DeEdwardo et al. ...... 260/45.9 NP |
| 4,053,456 | 10/1977 | Dieck et al. ............ 525/538 X |
| 4,061,606 | 12/1977 | Dieck et al. ............ 260/2.5 R |
| 4,073,824 | 2/1978 | Dieck et al. ............ 525/538 X |
| 4,073,825 | 2/1978 | Dieck et al. ............ 260/824 R |
| 4,094,856 | 6/1978 | Guschi ................ 260/45.9 NP |
| 4,111,883 | 9/1978 | Mark et al. ............ 260/30.6 R |
| 4,120,838 | 10/1978 | Vicic et al. ............ 260/29.1 SB |
| 4,219,457 | 8/1980 | Taniguchi et al. ......... 523/205 |

Primary Examiner—Lorraine T. Kendell
Attorney, Agent, or Firm—Herbert P. Price

[57] ABSTRACT

Improved reinforcing fibers such as carbon fibers are provided which may be employed in composites to improve the impact resistance thereof. The fibers disclosed are coated with a sizing composition comprised of a blend of an epoxy resin and a organophosphazene elastomer.

16 Claims, No Drawings

SIZED REINFORCING FIBERS SUITABLE FOR USE IN COMPOSITES OF IMPROVED IMPACT RESISTANCE

REFERENCE TO RELATED APPLICATIONS

This application is related to application Ser. No. 454,326, filed Dec. 29, 1982, entitled "Sized Carbon Fibers Suitable for Use in Composites of Improved Impact Resistance" of Lincoln Ying and Thomas P. Carter, Jr.

BACKGROUND OF THE INVENTION

In the search for high performance materials, considerable interest has been focused upon various reinforcing fibers such as carbon fibers. Industrial high performance materials of the future are projected to make substantial utilization of fiber-reinforced composites, and carbon fibers theoretically have among the best properties of any fiber for use as high strength reinforcement. Among these desirable properties are corrosion and high temperature resistance, low density, high tensile strength, and high modulus.

Polymeric materials heretofore commonly have been selected as the matrix material in which the relatively delicate carbon fibers as well as other types of reinforcing fibers are incorporated to form high performance materials with the fibers serving as a lightweight fibrous reinforcement. Epoxy resins most frequently have been selected as the matrix material. Additionally, the use of polyimides as the matrix material has been proposed primarily because of the ability of the polyimides to withstand even higher temperatures during use.

In order to improve the handleability of the fibers without undue fiber damage during the formation of composite articles, it has been the common practice to apply a flexible size or finish to the surface of the same. See, for instance, the epoxy size disclosed in U.S. Pat. Nos. 3,837,904; 3,914,504; and 3,957,716. The sized fibers bearing the epoxy coating are commonly incorporated in an epoxy matrix resin and a rigid composite article is formed upon curing.

There has remained a need, however, for a size or finish for use with reinforcing fibers which is capable of enhancing the handleability of the fiber which at the same time improves the impact resistance of the composites employing the fiber as a reinforcing agent.

It is known to form blends of organophosphazene elastomers with epoxy resins (see, for example, U.S. Pat. Nos. 3,641,193; 3,867,344; 3,996,312; and 4,094,856) as well as with various other types of polymers (see, for example, the four U.S. patents cited immediately above as well as U.S. Pat. Nos. 4,026,839; 4,042,561; 4,061,606; 4,073,825; 4,111,883; and 4,120,838).

OBJECTS AND SUMMARY OF THE INVENTION

It is an object of the present invention to provide improved sized reinforcing fibers which when incorporated into a composite structure produce a structure which exhibits enhanced impact resistance.

It is an object of the present invention to provide improved sized reinforcing fibers which are particularly suited for use in the formation of composite structures.

It is an object of the present invention to provide improved sized reinforcing fibers which readily undergoing impregnation with a matrix material.

It is a further object of the present invention to provide an improved carbon fiber-reinforced composite structure comprising a polymeric matrix and a size on the carbon fibers which does not result in a substantial diminution in the overall physical properties of the composite structure.

These and other objects, as well as the scope, nature, and utilization of the claimed invention, will be apparent to those skilled in the art from the following detailed description and appended claims.

In accordance with one aspect of the present invention, a reinforcing fiber is provided having a coating on the surface thereof in a concentration of about 0.5 to 3.0 percent by weight based upon the weight of the reinforcing fiber of a sizing composition which comprises as a first component an epoxy resin and a second component consisting of an organophosphazene elastomer.

In accordance with another aspect of the present invention, a composite structure is provided comprising a rigid polymeric matrix having reinforcing fibers incorporated therein which are coated on the surface thereof with about 0.5 to 3.0 percent by weight based upon the weight of the reinforcing fibers of the sizing composition defined above.

DETAILED DESCRIPTION OF THE INVENTION

It has been discovered that reinforcing fibers which have been sized with a sizing composition comprised of a blend of an epoxy resin and an organophosphazene elastomer can be employed in composites to improve the impact resistance thereof.

Various types of reinforcing fibers known to those skilled in the art may be employed in the present invention. Exemplary reinforcing fibers include but are not limited to glass fibers, amorphous carbon fibers, graphitic carbon fibers, synthetic polymeric fibers, aluminum fibers, boron fibers, titanium fibers, steel fibers, tungsten fibers and ceramic fibers, etc. Carbon fibers are the preferred reinforcing fiber for use in the present invention.

The carbon fibers, if employed, preferably contain at least about 90 percent carbon by weight (e.g., at least about 95 percent carbon by weight in preferred embodiments) and such carbon may be either amorphous or graphitic in nature. Suitable carbon fibers are commercially available and commonly are of a relatively low denier per filament of approximately 0.5 to 2 thereby rendering the fibers susceptible to damage during handling in the absence of a satisfactory size coating, particularly if the fibers also possess a relatively high Young's modulus. Representative carbon fibers are disclosed in commonly-assigned U.S. Pat. Nos. 3,775,520; 3,900,556; 3,925,524; and 3,954,950.

The carbon fibers prior to sizing may optionally have their surface characteristics modified so as to improve their ability to bond to a resinous matrix material. Representative surface modification processes are disclosed in U.S. Pat. Nos. 3,657,082; 3,671,411; 3,723,150; 3,723,607; 3,754,957; 3,759,805; 3,859,187; 3,894,884; and in commonly-assigned U.S. patent application Ser. No. 222,970, filed Jan. 5, 1981.

The reinforcing fibers prior to sizing are preferably provided as a multifilamentary fibrous material such as a continuous length of a multifilamentary yarn, tow, strand, tape, etc. However, staple fibers or other fibrous assemblages may be satisfactorily sized through the use of the present invention. For best results the configuration of the reinforcing fibers is such that the surfaces of the individual fibers are substantially exposed when the size composition is applied.

As previously noted, the reinforcing fibers are provided with a flexible coating on the surface thereof which comprises as a first component an epoxy resin and a second component consisting of an organophosphazene elastomer.

The epoxy resin component may be any suitable epoxy resin. For example, the epoxy resin may be prepared by the condensation of bisphenol A (4,4'-isopropylidene diphenol) and epichlorohydrin. Also, other polyols, such as aliphatic glycols and novolak resins (e.g., phenol-formaldehyde resins), acids or their active hydrogen-containing compounds may be reacted with epichlorohydrin for the production of epoxy resins suitable for use as the resinous matrix material.

In preferred embodiments of the invention, epoxy resins are selected to serve as the resinous matrix material which possess terminal epoxide groups and are the condensation product of bisphenol A and epichlorohydrin of the following formula:

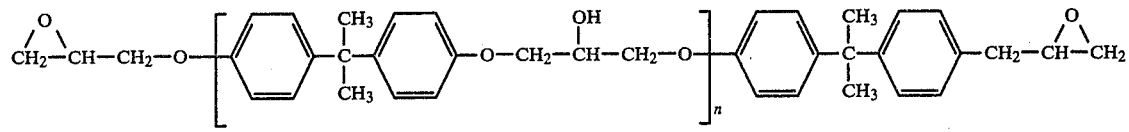

where n varies between zero and a number less than about 10. When n is zero, the resin prior to curing is a very fluid light-colored material which is essentially the diglycidyl ether of bisphenol A. As the molecular weight increases so generally does the viscosity of the resin. Accordingly, particularly preferred liquid epoxy resins generally possess an n value averaging less than about 1.0. Illustrative examples by standard trade designations of particularly useful commercially available epoxy resins include Epi-Rez 508, Epi-Rez 509 and Epi-Rez 510 (Celanese) and Epon 828 and Epon 815 (Shell) epoxy resins.

Exemplary epoxy resins are also disclosed in U.S. Pat. No. 2,951,825, herein incorporated by reference in its entirety. For example, the patent discloses triglycidyl derivatives of p-amino phenol formed by reacting an amino phenol with epichlorohydrin in the presence of a lithium catalyst to produce the corresponding chlorohydrin of the amino phenol. The chlorohydrin is then dehydrochlorinated to form the desired polyglycidyl derivative of the amino phenol. Such epoxy resins are well-known in the art and are marketed commercially by CibaGeigy under the tradename Araldite 0500 and 0510.

A variety of organophosphazene elastomers can be employed in the present invention. Such polymers are based on a backbone containing alternating phosphorous and nitrogen atoms with substituents attached to the phosphorous atoms. The preparation of organophosphazene elastomers is well known to those skilled in the art as evidenced by exemplary U.S. Pat. Nos. 3,370,020; 3,515,688; 3,702,833; 3,853,794; 3,856,712; 3,856,713; 3,883,451; 3,948,820; 3,974,242; and 4,042,561, each herein incorporated by reference.

The great majority of all phosphazenes, both cyclic and polymeric, are derived from hexachlorocyclotriphosphazene (I) or octachlorocyclotetraphosphazene (II) prepolymers. Both compounds are formed by the reaction of ammonium chloride with phosphorus pentachloride in a boiling organic solvent such as chlorobenzene or tetrachloroethane as follows:

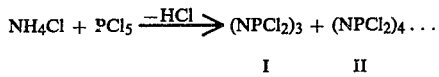

I   II

The cyclic trimer (I) amd tetramer (II) may comprise 90 percent of the reaction products with the trimer predominating, often in a 3:2 ratio. Hexachlorocyclotriphosphazene is a white, crystalline solid which melts at about 113°–114° C. It sublimes under vacuum and is soluble in organic media. It appears to be stable in air, but hydrolyzes in aqueous media to hydrochloric acid, ammonia and phosphate. Partially substituted derivatives and mixed organic substituted derivatives can also be obtained. Chlorine can be replaced by fluorine or isothiocyanate. A wide variety of other reagents such as organolithium or Grignard reagents can be used to introduce additional organic groups. Friedel crafts substitutions are also possible.

The organophosphazene elastomer can be formed from the prepolymers by methods known to those skilled in the art as disclosed, for example, in U.S. Pat. No. 3,370,020. In the method disclosed therein, the trimer (I) or tetramer (II) is initially thermally polymerized followed by further polymerization in the presence of a catalyst.

The epoxy-elastomer prepolymer blend may be formed in a common inert organic solvent for both the epoxy and the organophosphazene prepolymer (e.g., the trimer or tetramer) at room temperature. Exemplary suitable organic solvents include acetone, methyl alcohol, methyl ethyl ketone, methyl isobutyl ketone and dimethylformamide. The prepolymer is initially dissolved in the solvent to form a clear solution, after which the epoxy resin is added to the solution. Thereafter, a catalyst such as an organic peroxide catalyst (e.g., t-butylperbenzoate) in an amount of about 1 to 3 percent by weight based on the weight of the organophosphazene (preferably about 1 percent by weight) is added to the solution. The catalyst causes the prepolymer to cross-link thus forming an elastomer. This reaction occurs at an elevated temperature (e.g., 60° to 120° C.) and occurs during the removal of the solvent after sizing. The solvent used to make the solution is preferably acetone.

The two components can be combined in various proportions depending upon the physical characteristics desired in the final product. Generally, weight ratios of elastomer to epoxy resin ranging from about 1:99 to 99:1 have been found to be suitable. Ratios of 1:4 to 4:1 are particularly preferred.

If desired, a reactive crosslinking agent can be utilized to crosslink (i.e., cure) the blend although such an aspect is not preferred. Known cross-linking agents such as polyamines, e.g., triethylenetetramine, boron trifluorideamine complex, dibasic acid anhydride, substituted imidazoles, phenolics, and substituted phenol catalysts, and urea resins are suitable. The curing agent may be present in amounts ranging from about one percent by weight to about ninety percent by weight of the blend depending upon the specific curing agent and epoxy resins being utilized. Lewis acid curing agents, such as stannous chloride and boron trifluoride, require relatively low amounts, i.e., from about one to about five percent, whereas the amine complexes may require from four to fifteen percent and the carboxylated materials, e.g., carboxy terminated butadiene and methacrylic acid, as well as polyamides, such as those prepared by condensation of polymerized unsaturated acid with diamines, may require as much as fifty to ninety percent by weight.

Other types of conventional thermosetting (e.g., epoxy) resins can also be added or thereto to enhance various characteristics of the resulting product with the proviso that they are employed in amounts such that the elastomer is not caused to separate from the admixture.

A sizing solution can be prepared by adding the epoxyprepolymer mixture into a container together with acetone to produce a 2 to 5 percent solids solution (e.g., 3 percent solids) with stirring by means of a magnetic stirrer.

The solution which is capable of forming the size coating may be applied to the reinforcing fibers by any suitable technique such as dipping, padding, etc. The solution preferably is provided at a temperature of approximately room temperature (e.g. approximately 25° C.) when applied to the reinforcing fibers. Once the solution is applied, the solvent contained therein is substantially volatilized by heating in an appropriate zone which is provided at a more highly elevated temperature. The temperature of such zone will be influenced by the boiling point of the solvent selected and preferably does not exceed approximately 150° to 160° C. and is preferably from about 60° to 120° C. Heating times of approximately 2 minutes have been found to be satisfactory. Appropriate equipment and safety precautions must be taken to insure the safety of personnel in the area and to effectively deal with the explosion hazard created by solvent vapors. Every effort is made to remove the solvent to the fullest extent possible.

Upon volatilization of the solvent the size coating is deposited upon the surface of the reinforcing fiber in a concentration of about 0.5 to 3.0 percent by weight based upon the weight of the fiber, and most preferably in a concentration of about 1.1 to 1.5 percent by weight based upon the weight of the fiber.

The reinforcing fiber bearing the flexible size coating in accordance with the present invention may be handled without undue damage. The fuzz problem which commonly exists when one attempts to process continuous lengths of unsized carbon fibers is significantly reduced. Bundles of reinforcing fibers bearing the size coating are amenable to flattening and spreading thereby facilitating ready impregnation of the same by the matrix resin during the formation of a composite structure in accordance with standard technology. Such impregnation is believed to result in composite structures possessing improved mechanical properties. Carbon fiber bundles bearing the size of the present invention can be woven without any substantial damage to the relatively delicate carbon fibers.

The sized reinforcing fibers may be impregnated with the composition which forms the matrix resin in a suitable manner such as (1) by contact with a resin film followed by heat and pressure, (2) by pulling through a bath containing molten matrixforming components, or (3) by coating with a resin solution containing a low boiling solvent which is subsequently removed by passing the coated fibers through a heated oven.

The sized reinforcing fibers following curing preferably are provided in the polymeric matrix resin in a concentration of approximately 50 to 75 percent by weight and most preferably in a concentration of approximately 60 to 65 percent by weight based upon the total weight of the final composite structure.

The resulting composite articles can be utilized as strong lightweight structural components which are capable of service at elevated temperature (e.g., 95° to 205° C.). For instance, the composite articles may serve in aerospace components, particularly for skin structures, such as primary and secondary structures on aircraft.

The following examples are presented as a specific illustration of the claimed invention. It should be understood, however, that the invention is not limited to the specific details set forth in the examples.

EXAMPLE 1

The reinforcing fiber selected for sizing was a carbon fiber yarn of carbonaceous filamentary material derived from an acrylonitrile copolymer consisting of approximately 98 mole percent of acrylonitrile units and 2 mole percent of methylacrylate units. The carbonaceous material consisted of about 6000 substantially parallel filaments, containing about 93 percent carbon by weight, commercially available from the Celanese Corporation under the designation of Celion 6000. Representative average filament properties for the carbon fiber include a denier of 0.6, a tensile strength of approximately 470,000 psi, a Young's modulus of approximately 34 million psi, and an elongation of approximately 1.4 percent.

To a vessel were added incrementally, at room temperature with stirring, 25 parts by weight of an organophosphazene elastomer prepolymer obtained from Firestone Rubber under the designation PNF to 100 parts by weight of an epoxy resin available from Shell Chemical Co. under the trade designation Epon 828 in acetone. Subsequently, 1 percent by weight of t-butyl-perbenzoate, based on the weight of the PNF, and obtained from Witco Chemical under the designation Esperox 10, was added as a curing agent for the PNF. The mixed product is then added to acetone to form a 3 percent solution with stirring by a magnetic stirrer.

The resulting dilute size solution was applied to the carbon fiber. More specifically, the sizing of the continuous lenght of the carbon fibers was accomplished by dipping and being passed in the direction of its length at a rate of 5 meters per minute through a metal trough containing the sizing solution at room temperature, followed by passage through two rows of rubber rollers which removed the excess from the fiber bundle.

The solvent next was removed from the surface of the carbon fibers by drying for two minutes in a circulating air oven at 110° C. at which time the prepolymer is cured to form the elastomer. A flexible coating was provided on the surface of the carbon fiber in a concentration of about 1.2 percent by weight, which imparted highly improved handling characteristics to the carbon fibers while significantly reducing the fuzz level.

The sized carbon fiber was capable of spreading to accommodate impregnation with a standard epoxy matrix resin system (100 parts by weight of Epi-Rez 508 to 22.5 parts by weight of Epi-Cure 841 available from Celanese Corporation). The composite was formed by use of a 3 inch prepreg with laminates being fabricated by match-metal-die molding techniques using a 95° C. cure for 5 minutes and at 5 psi. followed by 165° C. for 45 minutes at 50 psi. during the formation of a carbon fiber reinforced composite structure. The mechanical properties of the composite were determined by standard ASTM procedures and summarized in Tables I and II.

COMPARATIVE EXAMPLE

The procedure of Example 1 was repeated with the exception that the elastomer was not employed. The mechanical properties of the composite thus produced were determined by standard ASTM procedures and are summarized in Tables I and II.

TABLE I

Mechanical Properties of Composites

| Sample | Short Beam Shear | | Impact Strength | |
|---|---|---|---|---|
| | Room Temperature (MPa) | 94° C. (MPa) | $P_i$ (N) | $P_f$ (N) |
| Comparative Example | 95.86 | 57.24 | 1188 | 1481 |
| Example 1 | 91.03 | 57.24 | 1397 | 1837 |

Note:
Impact strength data is normalized to 0.060 inch composite thickness.
Short beam shear data listed as obtained.

TABLE II

Mechanical Properties of Composites

| Sample | Tensile | | | | 0° Flexural | | | 90° Flexural | | |
|---|---|---|---|---|---|---|---|---|---|---|
| | Room Temp. | | 200° F. | | Room Temp. | | 94° C. | Room Temp. | | 94° C. |
| | STR (MPa) | MOD (GPa) | STR (MPa) | MOD (GPa) | STR (MPa) | MOD (GPa) | STR (MPa) | STR (MPa) | MOD (GPa) | STR (MPa) |
| Comparative Example | 1793 | 141.4 | 1855 | 144.8 | 1848 | 123.4 | 1069 | 81.38 | 7.45 | 71.03 |
| Example 1 | 1731 | 145.5 | 1786 | 133.1 | 1931 | 127.6 | 1090 | 74.48 | 8.21 | 63.45 |

Note:
Tensile and 0° Flexural data is normalized to 62 fiber volume percent in composite.
90° Flexural data listed as obtained.
STR and MOD denote strength and modulus, respectively.

It may therefore be seen that the inclusion of the organophosphazene elastomer in the epoxy-based sizing composition (Example 1) significantly enhances the impact strength of the composite articles produced from the sized reinforcing fibers. In addition, the other mechanical properties are not significantly impaired.

Although the invention has been described in conjunction with a preferred embodiment, it is to be understood that variations and modifications may be employed without departing from the concept of the invention as defined in the following claims.

We claim:

1. A reinforcing fiber having a coating on the surface thereof in a concentration of approximately 0.5 to 3.0 percent by weight based on the weight of the reinforcing fiber of a sizing composition which comprises as a first component an epoxy resin and a second component consisting of an organophosphazene elastomer.

2. The reinforcing fiber of claim 1 wherein said coating is present in a concentration of approximately 1.1 to 1.5 percent by weight.

3. The reinforcing fiber of claim 1 wherein said composition comprises an epoxy resin formed by the reaction of epichlorohydrin and bisphenol.

4. The reinforcing fiber of claim 1 wherein said epoxy resin and said elastomer are present in a weight ratio ranging from approximately 99:1 to 1:99.

5. The reinforcing fiber of claim 1 wherein said epoxy resin and said elastomer are present in a weight ratio ranging from approximately 4:1 to 1:4.

6. The reinforcing fiber of claim 1 wherein said fiber is selected from the group consisting of glass fibers, carbon fibers, synthetic polymer fibers, aluminum fibers, boron fibers, titanium fibers, steel fibers, tungsten fibers and ceramic fibers.

7. The reinforcing fiber of claim 6 wherein said reinforcing fiber comprises carbon fibers.

8. A composite structure comprising a rigid polymeric matrix having reinforcing fibers incorporated therein which are coated on the surface thereof with approximately 0.5 to 3.0 percent by weight based on the weight of the reinforcing fibers of a sizing composition which comprises as a first component an epoxy resin and a second component consisting of an organophosphazene elastomer.

9. The composite article of claim 8 wherein said coating is present in a concentration of approximately 1.1 to 1.5 percent by weight.

10. The composite article of claim 8 wherein said composition comprises an epoxy resin formed by the reaction of epichlorohydrin and bisphenol.

11. The composite article of claim 8 wherein said epoxy resin and said elastomer are present in a weight ratio ranging from approximately 99:1 to 1:99.

12. The composite article of claim 8 wherein said epoxy resin and said elastomer and present in a weight ratio ranging from approximately 4:1 to 1:4.

13. The composite article of claim 8 comprising approximately 50 to 75 percent by weight of said reinforcing fibers.

14. The composite article of claim 8 comprising approximately 60 to 65 percent by weight of said reinforcing fibers.

15. The composite article of claim 8 wherein said fiber is selected from the group consisting of glass fibers, carbon fibers, synthetic polymer fibers, aluminum fibers, titanium fibers, steel fibers, boron fibers, tungsten fibers and ceramic fibers.

16. The composite article of claim 15 wherein said reinforcing fiber comprises carbon fibers.

* * * * *